No. 791,935. PATENTED JUNE 6, 1905.
S. R. McKENZIE.
CULINARY BOILER.
APPLICATION FILED DEC. 22, 1904.

2 SHEETS—SHEET 1.

Witnesses:
Inventor:
Selma Rose McKenzie
Attorneys.

No. 791,935. PATENTED JUNE 6, 1905.
S. R. McKENZIE.
CULINARY BOILER.
APPLICATION FILED DEC. 22, 1904.

2 SHEETS—SHEET 2.

Witnesses:

Inventor,
Selma Rose McKenzie,

By
Attorneys

No. 791,935. Patented June 6, 1905.

UNITED STATES PATENT OFFICE.

SELMA ROSE McKENZIE, OF ALPENA, MICHIGAN.

CULINARY BOILER.

SPECIFICATION forming part of Letters Patent No. 791,935, dated June 6, 1905.

Application filed December 22, 1904. Serial No. 237,974.

*To all whom it may concern:*

Be it known that I, SELMA ROSE MCKENZIE, a citizen of the United States, residing at Alpena, in the county of Alpena and State of Michigan, have invented new and useful Improvements in Culinary Boilers, of which the following is a specification.

My invention relates to improvements in what may be termed "culinary boilers."

It has for its object, among other things, to provide for the cooking or preparing two or more articles of food or edibles simultaneously in a common means or utensil or only one or for preserving purposes, as may be desired, also to provide for slowly boiling or steaming the contents of such utensil as occasion may suggest.

Said invention consists of certain structural features substantially as hereinafter fully disclosed, and particularly pointed out by the claims.

Figure 1:
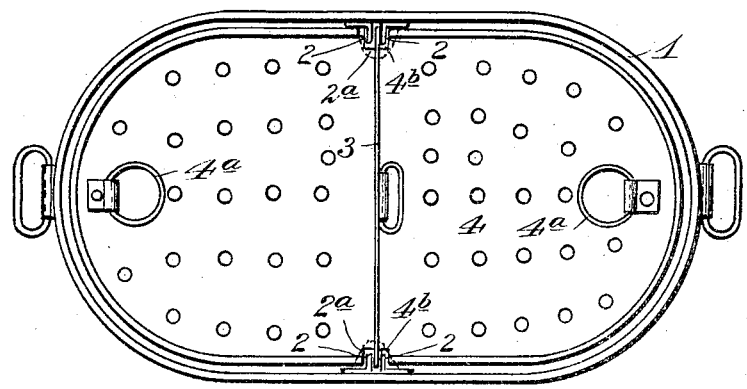
Figure 2:
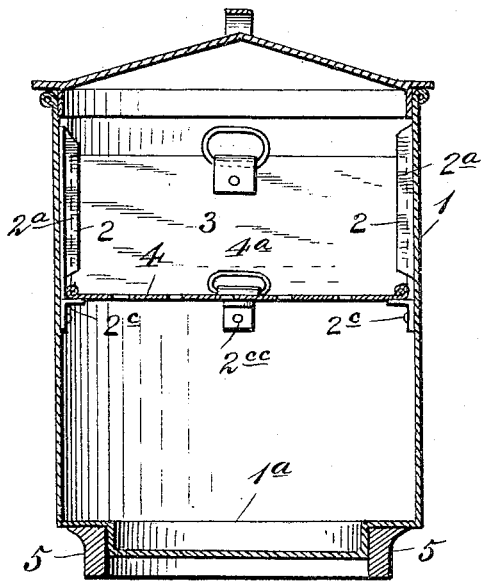
Figure 6:
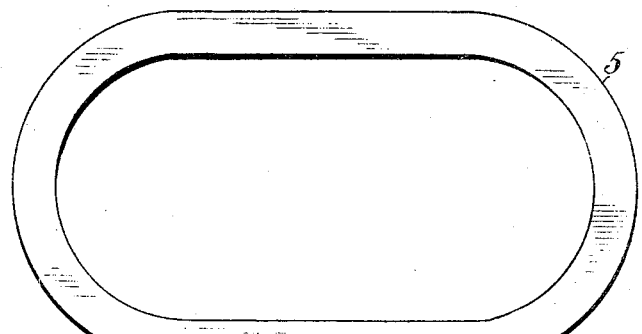
Figure 3:
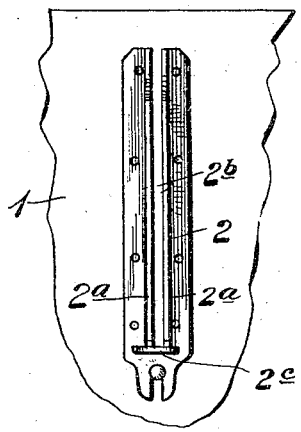
Figure 4:
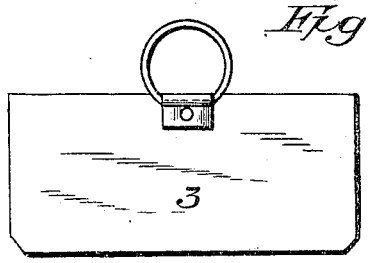
Figure 5:
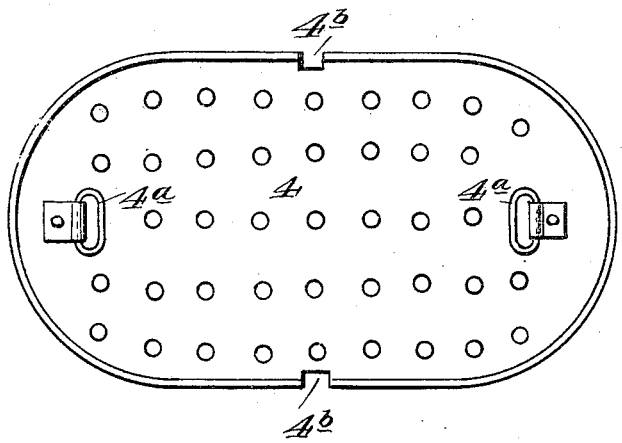

In the accompanying drawings, illustrating the preferred embodiment of my invention, Figure 1 is a plan view of the same with the cover or closure removed. Fig. 2 is a vertical or transverse section thereof. Fig. 3 is a broken-away detailed view showing more particularly one of the horizontal and vertical partitions supporting brackets. Fig. 4 is a detached view of the vertical partition. Fig. 5 is a like view of the horizontal foraminous partition or diaphragm. Fig. 6 is a separate view of the utensil-elevating spider-like support or rest for the cooking or preserving utensil or vessel, a sectional view thereof, with said vessel in position thereon, being disclosed by Fig. 2.

In the carrying out of my invention I provide a suitable utensil or vessel 1 of the character above noted, preferably of the general outline herein shown, and suitably secured by riveting or otherwise to the inner surface thereof at opposite lateral points about the mid-length of the upper portion of the chamber or interior of said vessel vertical brackets 2. Said brackets are formed each preferably of two plates, with outstanding or right-angled extensions or flanges $2^a$ extending vertically and arranged parallel to each other and suitably spaced apart to form a groove or guide $2^b$, said bracket, one upon each side of the vessel, thus forming two grooves or guides to receive the ends of a vertical partition 3 held in position thereby. Each bracket has also extending at a right angle therefrom a short interval below or from the lower end of its groove or guide $2^b$ a horizontal ledge or lug $2^c$, and from the inner surface of the vessel at its ends also extend corresponding lugs $2^{cc}$, arranged about in the same general horizontal level with the aforesaid lug $2^c$. These lugs form supports for a horizontal preferably perforated or foraminous partition or diaphragm 4, having folding or loosely-connected finger-hold or lifting-rings $4^a$ for its convenient removal and replacement, as may be required. In order to permit said partition or diaphragm to pass the flanges $2^a$, forming the grooves $2^b$ of the brackets 2, secured to said vessel, as said partition is put into place, said partition may be provided with lateral notches or recesses $4^b$ of the requisite depth to receive said flanges as necessary for that purpose.

By the use of the horizontal partition or diaphragm, subdividing the vessel or utensil into an upper and a lower compartment or chamber, the desired edibles may be cooked or boiled in the water placed and heated in the lower chamber, and any dough inclosed or other food article, as dumplings, puddings, &c., may be subjected to a steaming action for the cooking thereof in the upper chamber, the steam, as is apparent, passing through the foraminous diaphragm, the thus formed bottom of said chamber. With the vertical partition also in place, subdividing the upper compartment into two subchambers, it is obvious that different kinds of such dough-inclosed food-articles may be cooked therein, respectively, or by dispensing with said partitions altogether the entire utensil or vessel may be devoted to cooking or preparing any one kind of edible or fruit, as for preserving purposes, &c.

In order to prevent the "burning" or premature overcooking of the vessel contents, a somewhat spider-like device or contrivance 5 is provided, upon which to support the vessel or utensil elevated or out of direct contact with the stove or heating-surface in preparing or cooking said contents, a slowly boiling or cooking action of the latter being obtainable by the aid thereof. Said contrivance is, of course, of the general oblong contour of the cooking utensil which it is intended to support and is preferably right-angled mainly in cross-section at any point in its formation or outline. The cooking utensil or vessel has its bottom formed at a short distance inward from its vertical side and end portions, with a depressed or downward extended central portion $1^a$, which when said vessel is in use depends within and is encompassed by the contrivance or support 5, but is of less depth than the latter, and consequently is thus removed from or out of contact with the heating surface or stove for the purpose aforesaid.

Latitude is allowed as to details herein, as they may be changed as circumstances suggest without departing from the spirit of my invention.

I claim—

1. A cooking utensil having secured thereto vertical inward-extending brackets arranged at opposite points therein about at its mid-length, in the upper portion, and having horizontal inward-extending lugs at their lower ends, a horizontal foraminous partition adapted to rest upon said lugs, and a vertical partition having its ends received by said brackets.

2. A cooking utensil having secured thereto vertical brackets arranged at opposite points therein about at its mid-length, in the upper portion, each bracket consisting of two parallel members with inward-extending spaced-apart flanges or extensions forming a vertical guide or groove, said brackets having inward-extending horizontal lugs arranged below the guides or grooves thereof, a horizontal foraminous partition adapted to rest upon said lugs and additional like lugs upon said utensil, and a vertical partition adapted to be upheld by said brackets.

In testimony whereof I affix my signature in presence of two subscribing witnesses.

SELMA ROSE McKENZIE.

Witnesses:
   FRANK A. SCOTT,
   E. M. COOK.